United States Patent [19]

de Lange

[11] Patent Number: 4,465,307
[45] Date of Patent: Aug. 14, 1984

[54] PIPE COUPLER FOR INSULATED PIPES
[75] Inventor: Tinus de Lange, Voormshoop
[73] Assignee: Wavin B.V., Zwolle, Netherlands
[21] Appl. No.: 394,131
[22] Filed: Jul. 1, 1982
[30] Foreign Application Priority Data Jul. 2, 1981 [NL] Netherlands ................ 8103193

[51] Int. Cl.³ .................. F16L 59/16; F16L 41/00; F16L 25/00
[52] U.S. Cl. ............................. 285/47; 285/156; 285/381; 138/149
[58] Field of Search .................. 285/47, 156, 381; 138/149, 151, 156

[56] References Cited

U.S. PATENT DOCUMENTS

| 2,330,966 | 10/1943 | Gottwald . | |
|---|---|---|---|
| 2,592,574 | 4/1952 | Kaiser . | |
| 2,937,662 | 5/1960 | Green | 285/156 X |
| 3,453,716 | 7/1969 | Cook | 285/47 X |
| 3,630,547 | 12/1971 | Hartshorn . | |
| 3,744,823 | 7/1973 | Muir et al. | 285/47 X |
| 3,871,400 | 3/1975 | Thastrup . | |
| 3,891,006 | 6/1975 | Lee . | |
| 4,025,091 | 5/1977 | Zeile | 138/149 X |
| 4,084,842 | 4/1978 | Stonitsch et al. | 285/47 |

Primary Examiner—Richard J. Scanlan, Jr.
Attorney, Agent, or Firm—Wilkinson, Mawhinney & Theibault

[57] ABSTRACT

The invention relates to a coupler for insulated plastic pipe ends and a branch pipe end, the insulation being covered with tubular casings. The coupler is provided with anchoring means comprising one or more ribs or cams extending laterally from the central coupler 1 and with means for transmitting pressure forces from the anchoring means and the central coupler to the tubular casings.

3 Claims, 4 Drawing Figures

U.S. Patent    Aug. 14, 1984    Sheet 2 of 2    4,465,307
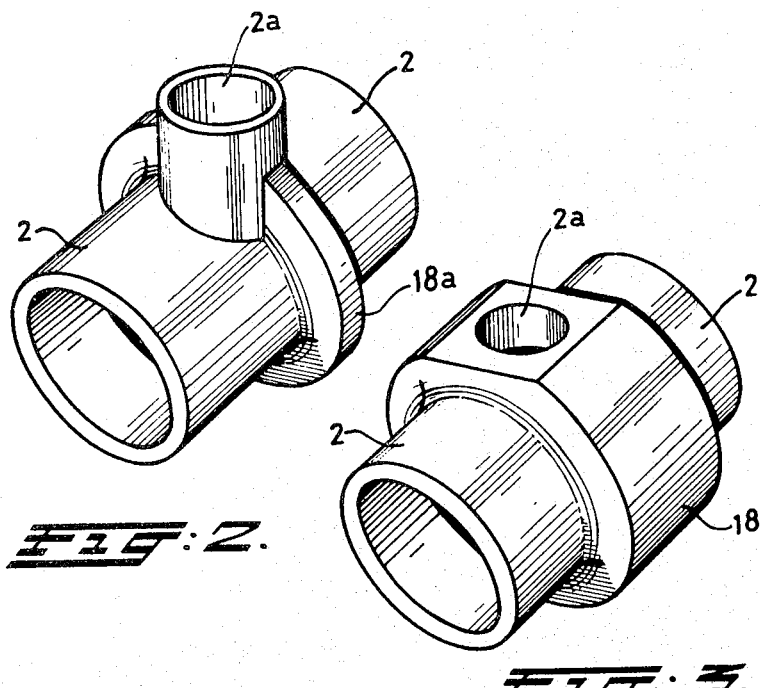
Fig. 2.
Fig. 3.
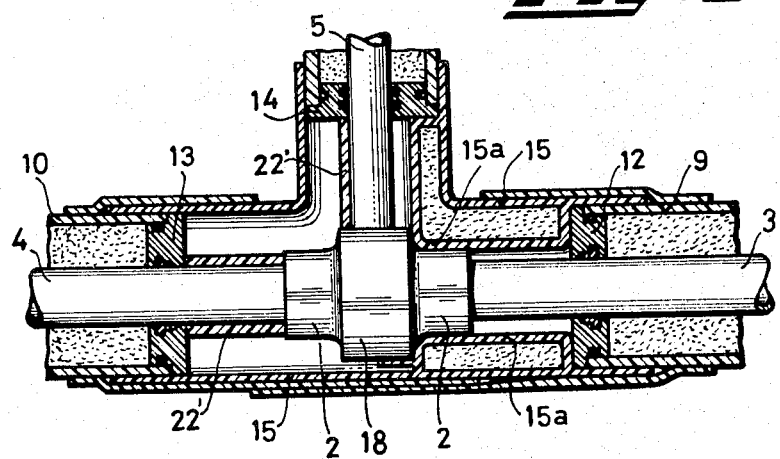
Fig. 4.

PIPE COUPLER FOR INSULATED PIPES

BACKGROUND OF THE INVENTION

1. Field of the Invention

The invention relates to a pipe coupler for use in coated pipe-lines, more particularly a branch connection provided with an insulating coating for the main pipe ends of insulated pipe-lines of plastics.

2. Description of the Prior Art

Insulated pipe-lines are used, for example, for carrying hot water for district heating and consist of a pipe-line for the fluid to be conveyed, with larger diameter tubular casings disposed concentrically around said pipe-line, the space between the pipe ends of the pipe-line and the tubular casing being filled with insulating material, more particularly a foam material.

If a pipe end has to be provided with a branch connection, a branch pipe is welded to said pipe end and thus the latter will be devoid of insulating material and a tubular casing at a place where it is connected to the branch pipe. A shell is then disposed around the whole system, insulating material (e.g. foam) being present in this shell. A pipe connection of this kind is described, for example, in Dutch Patent application No. 8100776, being not a prior publication. A good connection is obtained in fitting a branch pipe to a pipe end by welding the branch pipe directly to a pipe end of a pipe-line.

However, due to temperature effects the pipe end may shift longitudinally with respect to the tubular casing. As the branch pipe cannot shift laterally in view of the insulating material, the weld between the branch pipe and the pipe end is undesirably subjected to loading.

SUMMARY OF THE INVENTION

It is a primary object of the present invention to obviate this disadvantage by providing a novel pipe coupler.

According to the invention in a pipe coupler for use in coated pipe-lines, more particularly for connecting insulated main pipe ends made of plastics, a central coupler has connecting sections for the pipe ends and co-operates with anchoring means adapted to bear against adjacent materials, more particularly against the insulating coating.

As the anchoring means bears against the surrounding material, e.g. insulating coating when the latter is of a certain hardness, the main pipe ends displacements occurring as a result of temperature changes are absorbed by the body and thus, the welds to the branch pipe are not subjected to loading. The insulated pipes are provided with relatively rigid tubular casings and according to the invention means are provided for transmitting pressure forces from the anchoring means to the tubular casings of insulated pipes.

According to the invention, the pipe coupler construction is such that the anchoring means comprise one or more ribs or cams extending laterally from the central coupler.

The present invention also relates to a method of fitting a pipe coupler, sealing plugs being fitted around the pipe ends, the latter being fixed in the connecting sections of the central coupler, while an outer shell is placed around the pipe ends, the central coupler and the ends of the tubular casings containing the plugs are sealed, and the interior of the outer shell is filled by foaming foam material.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 2 is a perspective view of a central coupler provided with anchoring means;

FIG. 3 is a perspective view of a variant construction of the central coupler of FIG. 2; and FIG. 4 is an axial section of the pipe coupler of the present invention showing two forms of outer shell support means, one to the right, and one to the left of the branch connection.

DESCRIPTION OF THE PREFERRED EMBODIMENTS

Figure 1:
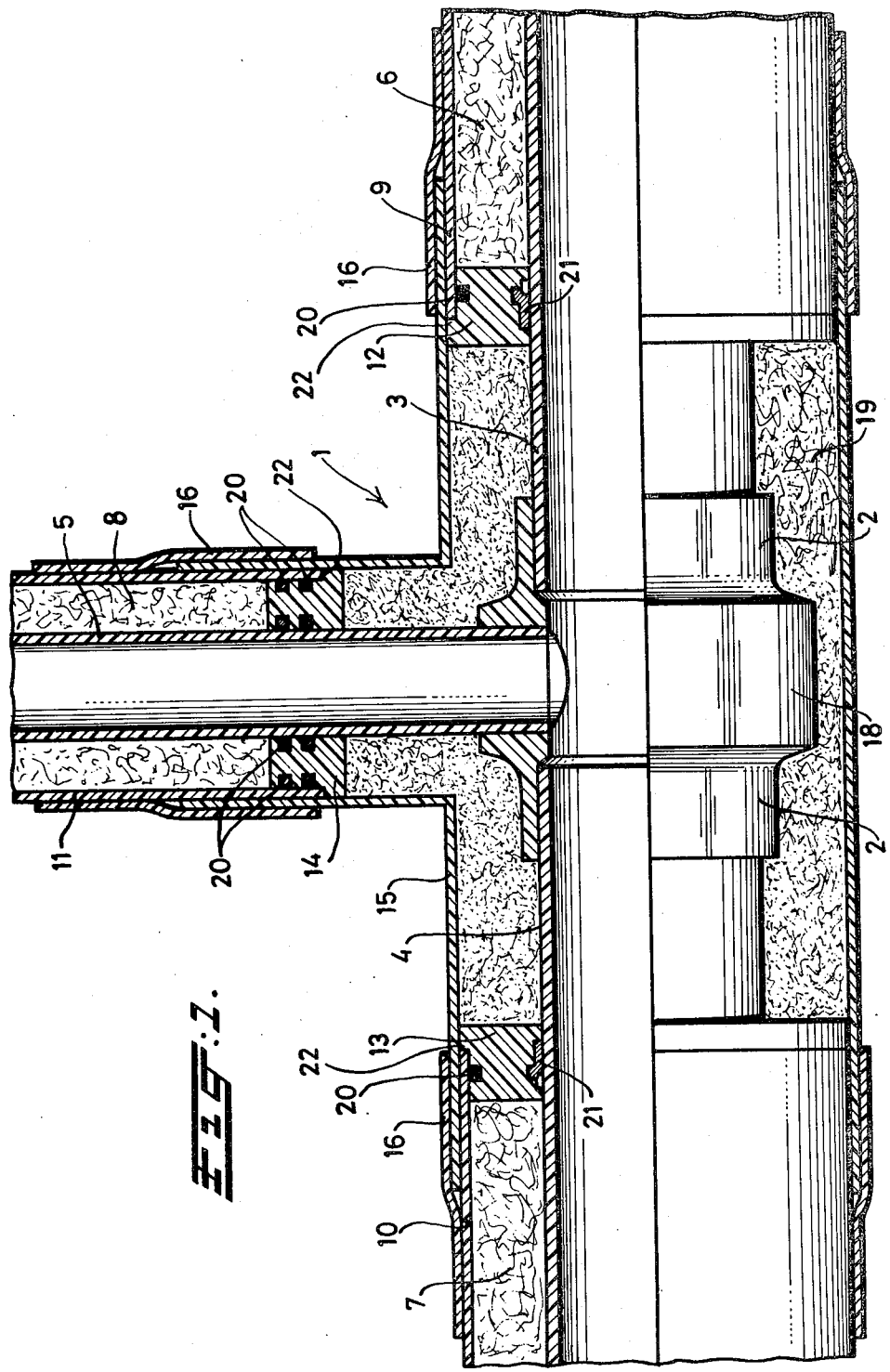
FIG. 1 is an axial section through a pipe coupler according to the invention with insulated plastic pipe ends.

Referring now to FIG. 1, the pipe coupler having the general reference 1 is used for the connection of a fluid conveying main pipe to a branch pipe end 5. The pipe ends of the main pipe are denoted by references 3 and 4. The pipe ends 3, 4 and 5 are surrounded by insulating layers 6, 7 and 8 respectively and tubular casings 9, 10 and 11 respectively. The pipe coupler is formed by a central coupler provided with two connecting sections 2 for the pipe ends 3 and 4. The central coupler with the connecting sections 2 for the pipe ends 3 and 4 co-operates with anchoring means 18 adapted to bear against adjacent material, more particularly the insulating coating, as will be described hereafter.

The anchoring means are one or more ribs or cams (see also FIGS. 3 and 4) and in the form of a flange 18a (FIG. 2), said anchoring means extending laterally from the central coupler. The anchoring means 18 and 18a are therefore disposed between two connecting sections which are disposed opposite each other for the pipe ends 3 and 4, and side surfaces of the anchoring means are disposed transversely of the direction of the length of the pipe ends which are to be secured to the connecting sections. At the anchoring means 18, 18a the central coupler is provided with at least one connecting section 2a for a branch pipe end 5 extending from the two facing connecting sections 2 for the pipe ends 3 and 4 of the main pipe.

According to the invention means are also provided for transmitting pressure forces from the anchoring means to the tubular casings of the insulated pipes, as will be explained hereafter. The coupler 1 has an outer shell 15 to accomodate insulating material 19, which is preferably a hard plastic foam.

When the coupler 1 has been mounted, the connecting means 18 or 18a constructed as a peripheral collar bears snugly against the insulating material 19 surrounded by the outer shell 15 and the latter is arranged for connection to tubular casings 9, 10 and 11 of the interconnected insulated pipe ends 3, 4 and 5.

In the case of shifting of the pipes 3 and 4 due to the heat of the flowing fluid, the weld to the pipe 5 is not subjected to loading because the anchoring means absorbs the forces in the foam material 19. The pipe cannot move laterally in the event of any displacement of the pipe ends 3 and 4. The forces occurring as a result are thus absorbed entirely by the anchoring means.

Annular sealing plugs 12, 13 and 14 are provided between the pipe ends and the tubular casings as the connection to the outer shell 15, which may consist of two mirror-symmetrical halves or be split, so that the same can be placed over the pipe ends 3 and 4 and the tubular casings 9 and 10. These plugs seal the insulation 6, 7 and 8 between the pipes for the flowing fluid and the tubular casings 9, 10 and 11 respectively off from the space or the insulating material 19 in the outer shell 15 of the coupler 1. The annular plugs 12, 13 and 14 have on the outer periphery a collar 22 which bears against the end face of the tubular casings 9, 10 and 11 respectively. This provides means for transmitting the pressure forces from the anchoring means to the tubular casings of the insulated pipes, i.e. by means of the hard plastic foam 19 (in the example as depicted). The inner and outer surfaces of the sealing plugs are provided with one or more peripheral grooves to receive a sealing ring 20 or gasket 21.

The outer shell 15 with its open ends engages around the tubular casing co-operating with these open ends and the seams between the edges of the open ends and the casings are covered by heatshrunk sleeves 16 disposed therearound. Consequently no moisture can penetrate the space containing the foam 19.

The external transverse dimensions of the anchoring means 18 are larger than the transverse dimensions of the connecting sections 2 as will be clear from the drawing. The dimensions of the anchoring means 18 parallel to the axis of the connecting sections 2 are so large that another pipe end 5 can be placed in the anchoring means 18. To this end, the anchoring means 18 is formed with an aperture 2a acting as a connecting section.

Referring now to FIG. 2, in this embodiment a separate connecting section 2a can be used at the anchoring means 18a and evidently its construction depends entirely on the configuration of the coupler. For example, connections for even more pipes may be provided instead of just one connection for a third pipe. The aperture 2a or connecting section 2a to receive a pipe end 5 is so disposed that its axis is at an angle to the axis of the two connecting sections 2 diposed in extension of one another. The pipe ends can be secured by known welding techniques evolved for this purpose.

When the pipe coupler is fitted, the anchoring means in the form of a peripheral collar bears snugly against the part of the insulation surrounded by the other shell.

The anchoring means 18 need not in all cases co-operate with foam 19. Forces can alternatively be transmitted from the anchoring means 18 through the plugs 12, 13 or 14 to the casings 9, 10 and 11 respectively by the configuration of the outer shell 15 (see the right-hand part of FIG. 4) in which the outer shell 15 has an inner shell section 15a acting as transmission means between the anchoring means 18 and the plug 12. As shown in the left-hand part of FIG. 4, a spacer bush 22' can be used as force-transmitting means between the central coupler, more particularly the connecting section 2 and the plug 13 and between the anchoring means 18 and the plug 14. If required the bush may be of split construction.

The pipe coupler is mounted in the field where the pipe is laid by a special method according to the invention, comprising securing the pipe ends 3 and 4 in the connecting sections 2 and the pipe end 5 in the aperture 2a or connecting section 2a, placing the outer shell 15 around the pipe ends, connecting sections, central coupler and the tubular casings 9, 10 and 11, whereupon the shrinkable sleeves 16 are put in position and heatshrunk, whereupon the interior of the outer shell 15 is filled by foaming foam material 19.

Although the present invention has been shown and described in connection with preferred embodiments thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A pipe coupler for use with main plastic pipe lines, comprising:
   a central coupler having an outer shell and connecting means connecting said main pipe lines thereto and having at least one branch connection,
   outer tubular casings about said main pipe lines and said branch connection,
   an insulated foamed support for said central coupler main and branch pipe lines between said pipe lines and said outer casings,
   an insulated foamed support for said central coupler main and branch pipe lines between said pipe lines and said outer casings,
   annular sealing plugs disposed between the main pipe and branch pipe ends and said tubular casings at the connection of the outer shell of said branch connection to the casings,
   spacer bush means disposed around said main and branch pipe ends between said central coupler and each of said sealing plugs, said spacer bushes being of split construction.

2. The pipe coupler of claim 1 wherein inner and outer surfaces of said annular sealing plugs have at least one peripheral groove to receive a sealing ring or gasket.

3. A pipe coupler as claimed in claim 1 wherein said central coupler has a solid annular flange integral with said branch connection.

* * * * *